United States Patent
Zanetta et al.

(10) Patent No.: US 10,537,782 B2
(45) Date of Patent: Jan. 21, 2020

(54) METHOD AND SYSTEM FOR MEASUREMENT OF A CROSSING TIME, AND TRANSPONDER MODULE FOR THE SYSTEM

(71) Applicant: Swiss Timing Ltd, Corgemont (CH)

(72) Inventors: Andre Zanetta, Wavre (CH); Gael Coron, Cottens (CH); Reto Galli, Munchenbuchsee (CH)

(73) Assignee: Swiss Timing Ltd, Corgemont (CH)

( * ) Notice: Subject to any disclaimer, the term of this patent is extended or adjusted under 35 U.S.C. 154(b) by 496 days.

(21) Appl. No.: 15/016,892

(22) Filed: Feb. 5, 2016

(65) Prior Publication Data
US 2016/0279500 A1   Sep. 29, 2016

(30) Foreign Application Priority Data

Mar. 26, 2015   (EP) ..................................... 15161179

(51) Int. Cl.
  *A63B 71/06*   (2006.01)
  *G05B 15/02*   (2006.01)
(52) U.S. Cl.
  CPC .............. *A63B 71/06* (2013.01); *G05B 15/02* (2013.01)
(58) Field of Classification Search
  CPC ........... A63B 71/06; G05B 15/02; G07C 1/22
  USPC ......................................................... 700/91
  See application file for complete search history.

(56) References Cited

U.S. PATENT DOCUMENTS 5,140,307 A   8/1992  Rebetez et al.
5,511,045 A   4/1996  Sasaki et al.
2003/0235116 A1*  12/2003  Stobbe ............... A63B 69/0028
                                                          368/3
2004/0160355 A1   8/2004  Bervoets et al.
2008/0074954 A1*   3/2008  Moritani ................. G04F 10/00
                                                          368/113

(Continued)

FOREIGN PATENT DOCUMENTS

EP   0 435 055 A1   7/1991
EP   1 376 272 A2   1/2004

(Continued)

OTHER PUBLICATIONS

European Search Report dated Sep. 2, 2015 in European application 15161179.5 filed on Mar. 26, 2015.

*Primary Examiner* — Omkar A Deodhar
*Assistant Examiner* — Wei Lee
(74) *Attorney, Agent, or Firm* — Oblon, McClelland, Maier & Neustadt, L.L.P.

(57) ABSTRACT

The method makes it possible to perform the measurement of at least one crossing time of a moving object on a line of passage via a personalized transponder placed on the object. The method includes the steps of:
  generating a low frequency electromagnetic field signal,
  activating the transponder module on reception of the modulated synchronization command in the electromagnetic field signal,
  measuring the intensity of the electromagnetic field signal without modulation captured by the activated transponder module at regular time intervals,
  transmitting directly in a measurement signal via the transponder module each intensity measurement or a packet of intensity measurements to the decoder unit for determination of a crossing time of the line of passage.

28 Claims, 3 Drawing Sheets

(56) References Cited

U.S. PATENT DOCUMENTS

2009/0303005 A1* 12/2009 Tuttle ..................... H04Q 9/00
340/10.1
2014/0169140 A1   6/2014 Bisig et al.
2016/0047932 A1*  2/2016 Akaba ................ G01N 29/2443
324/727

FOREIGN PATENT DOCUMENTS

| EP | 2 453 415 A1 | 5/2012 |
| EP | 1 447 681 B1 | 10/2013 |
| EP | 2 747 036 A1 | 6/2014 |

* cited by examiner

METHOD AND SYSTEM FOR MEASUREMENT OF A CROSSING TIME, AND TRANSPONDER MODULE FOR THE SYSTEM

This application claims priority from European Patent Application No. 15161179.5 filed on Mar. 26, 2015, the entire disclosure of which is hereby incorporated herein by reference.

FIELD OF THE INVENTION

The invention concerns a method for measurement or determination of at least one crossing time of at least one moving object on a line of passage via a transponder module in a sports competition. In a measurement system for a sports competition, each moving object, such as a competitor, is provided with a personalised transponder module for determination of a race time or of a crossing time of a line of passage.

The invention also concerns a system for measurement or determination of at least one crossing time for implementation of the method.

The invention also concerns a transponder module for the system for measurement or determination of at least one crossing time.

BACKGROUND OF THE INVENTION

In a sports competition, it is often necessary to use several devices to detect and store the measured time of a race, in order to ensure the serviceability of the measuring system. These devices must also ensure good measurement accuracy and measurement security to be able to form an automated measuring system. The devices used in this type of measuring system are, for example, contact strips, cameras, photoelectric cells and transponders.

It should also be noted that if the time difference between athletes is less than the accuracy of the transponders used, a manual checking operation must also be used. The conventional measuring system cannot therefore be entirely automated, which is a drawback.

U.S. Pat. No. 5,511,045 describes an apparatus and a system for timing moving objects, such as sports persons, during a sports competition. The measuring system performs a time measurement for each competitor from the start line to the finish line, and a measurement of split or intermediate times. One or more transmitters/receivers are disposed at points on the race track to capture information from the personalised transponders worn by the competitors. Each transponder can be incorporated in a watch worn on the wrist of each competitor. When each transponder detects a detection signal from a transmitter, the identification code is transmitted by the transponder to be captured by a receiver when the competitor crosses a line. This allows the receiver to determine the time for each competitor based on the received identification code. No other information is transmitted by each transponder for exact determination of the time that an intermediate or finish line is crossed. This constitutes a drawback of this measurement system.

EP Patent No 1 447 681 B1, which discloses a system for determination of a crossing time, may also be cited. The determination system includes a magnetic field signal generating arrangement, personalised transponders each worn by a moving object, such as a competitor, and a receiver of signals received from transponders. Each transponder measures several intensities of a magnetic field transmitted on each line of passage by the signal generating arrangement. Each transponder transmits these intensities and associated times so as to allow the receiver to determine a crossing time. However, no absolute time reference is defined to allow a processing means of the receiver to reconstruct the magnetic field pattern and thus to accurately determine the actual crossing time of each transponder. Further, the determined crossing time of each transponder is determined on the basis of magnetic field intensity samples taken at random times, which constitutes an additional difficulty for accurately determining the crossing time. These are several drawbacks of this system for determination of a crossing time.

EP Patent Application No 2 747 036 A1 describes a method and a system for the measurement of a time in a sports competition with at least one personalised transponder module placed on the competitor. Said module can be activated either at the start of the race, or at intermediate positions on the race course or track or at the finish line. A variation in motion is detected by a motion sensor of said module at at least one crossing point. The motion measurements can be transmitted from the module to a decoder unit to check a crossing time. However, it is difficult to accurately measure the crossing time of one or more activated modules at a defined crossing point, which constitutes a drawback.

SUMMARY OF THE INVENTION

It is therefore an object of the invention to overcome the drawbacks of the aforementioned state-of-the-art by proposing a method for measurement of at least one crossing time of a moving object on a line of passage, notably in a sports competition, via a personalised transponder module placed on the moving object. The crossing time can thus be very accurately determined in an automatic manner.

The invention therefore concerns a method for measurement of at least one crossing time at a line of passage of at least one moving object by means of a personalized transponder module placed on the moving object, during a sports competition in a measuring system, which includes at least one unit for transmission of an electromagnetic field signal via an antenna disposed on the line of passage and a decoder unit for receiving at least one measurement signal from each transponder module in proximity to the line of passage, the method including the steps consisting in:

generating an electromagnetic field signal by the transmission unit, the electromagnetic field signal comprising a modulation of a synchronization command at the start of each modulation repetition period, activating the personalised transponder module on the first reception of the modulated synchronization command in the electromagnetic field signal, measuring the intensity of the electromagnetic field signal without modulation captured by the transponder module once activated and synchronized, at regular time intervals, transmitting directly via the transponder module each intensity measurement or a packet of intensity measurements to the decoder unit for determination of a crossing time of the line of passage on the basis of the variation in the electromagnetic field intensity of the measurements received from the transponder module.

Particular steps of the method for measurement of at least one crossing time on a line of passage are defined in the dependent claims 2 to 20.

One advantage of the method for measurement of at least one crossing time on a line of passage, notably of a competitor in a sports competition, lies in the fact that the low frequency electromagnetic field signal transmits at least one synchronisation command for each transponder module, in order to wake-up the module to enable it to perform the intensity measurements.

Advantageously, each transponder module approaching a line of passage can be synchronised by an OOK modulated low-frequency electromagnetic field signal, for example at 125 kHz. Once synchronised, the transponder module can measure the intensity of the electromagnetic field captured at regular time intervals during which the electromagnetic field signal is not modulated and generated at a fixed or constant frequency and amplitude. This results in improved accuracy of the crossing time on a line of passage, which also avoids erroneous measurements, particularly by a modulated electromagnetic field signal. Each transponder module capable of detecting the electromagnetic field signal, is woken-up and synchronised, in order to obtain several activated transponder modules synchronised to a data processing station controlling an electromagnetic field signal generation unit.

Advantageously, the transponder module is woken only by a low-frequency electromagnetic field signal, which may be at a carrier frequency between 100 kHz and 150 kHz. This electromagnetic field signal contains an OOK modulated synchronisation message. The battery will not therefore be discharged unnecessarily in the presence of an interfering electromagnetic field in the frequencies between 100 kHz and 150 kHz.

Advantageously, each activated and synchronised transponder measures one or more successive groups of electromagnetic field intensity measurements, preferably by means of a triaxial antenna at regular time intervals. The orientation of the transponder module on the athlete can thus be corrected by the algorithm embedded in the data processing station. For some competitions, this makes it possible to correct the line-crossing time according to the position of the transponder module on the moving object. These measurements are preferably transmitted in packets prior to the crossing of the line, particularly the finish line, in order to predict the crossing of said line. Determining field variation in the decoder unit of the system based on groups of measurements received from the transponder module, makes it possible to accurately determine the line-crossing time of the competitor. This prevents the race timing device going backwards during determination of the actual crossing time to be displayed. However, the exact crossing time is determined again once said line of passage is crossed.

Advantageously, each activated and synchronised transponder module can directly transmit each group of electromagnetic field intensity measurements, defining a data packet relating to each determined measurement time or interval. At least two, three or four groups of intensity measurements must be received by the decoder unit to determine the line-crossing time. Receiving the various groups of measurements makes it possible to predict the actual time of crossing the line of passage, given that the group or groups of intensity measurements are measurements preceding the crossing of the line and preferably between 50 to 100 ms before the transponder module actually crosses the line of passage.

Advantageously, once each transponder module has crossed the line, a command from the decoder unit via a high frequency UHF control signal can be transmitted to the transponder module in order to deactivate it and thus set it in rest mode.

The invention therefore also concerns a measuring system suitable for implementation of the method for measurement of at least one crossing time at a line of passage, wherein the measuring system includes a set of transponder modules each capable of being carried by a moving object and each personalized to a moving object, at least one unit for transmission of an electromagnetic field signal via an antenna disposed on the line of passage and a decoder unit for at least receiving at least one measurement signal from each activated transponder module in proximity to the line of passage, and in that each transponder module in proximity to the line of passage is activated by reception of a synchronisation and activation command in the electromagnetic field signal in order to perform intensity measurements of the electromagnetic field signal without modulation and to transmit these measurements to the decoder unit.

Specific embodiments of the measurement system are defined in the dependent claims 22 and 23.

To this end, the invention also concerns a transponder module of a measuring system suitable for implementation of the measuring method, wherein the transponder module includes a low frequency signal receiver for receiving the electromagnetic field signal, via a low frequency antenna, a microcontroller receiving a reception signal from the receiver capable of measuring the intensity of the captured electromagnetic field signal without modulation, once activated by reception of a modulated synchronisation command in the electromagnetic field signal, at least one transmitter in association with the microcontroller for transmission via a high frequency antenna of at least one high-frequency measurement signal.

Particular embodiments of the transponder module are defined in the dependent claims 25 to 27.

Advantageously, the transponder module may be of the active type, but woken up on detection of a low frequency electromagnetic field signal with the wake-up and synchronization command from a transmission unit of the measurement system.

BRIEF DESCRIPTION OF THE DRAWINGS

The objects, advantages and features of the method for measurement of at least one crossing time of at least one moving object on a line of passage via a transponder module in an automated measuring system, the system and the transponder module for implementation thereof will appear more clearly in the following description of at least one non-limiting embodiment illustrated by the drawings, in which.

DETAILED DESCRIPTION OF THE INVENTION

In the following description, all those elements of the measuring system and of the transponder module for implementing the method for measurement of a crossing time on a line of passage, which are well known to those skilled in the art in this technical field, will only be described in a simplified manner.

Figure 1:
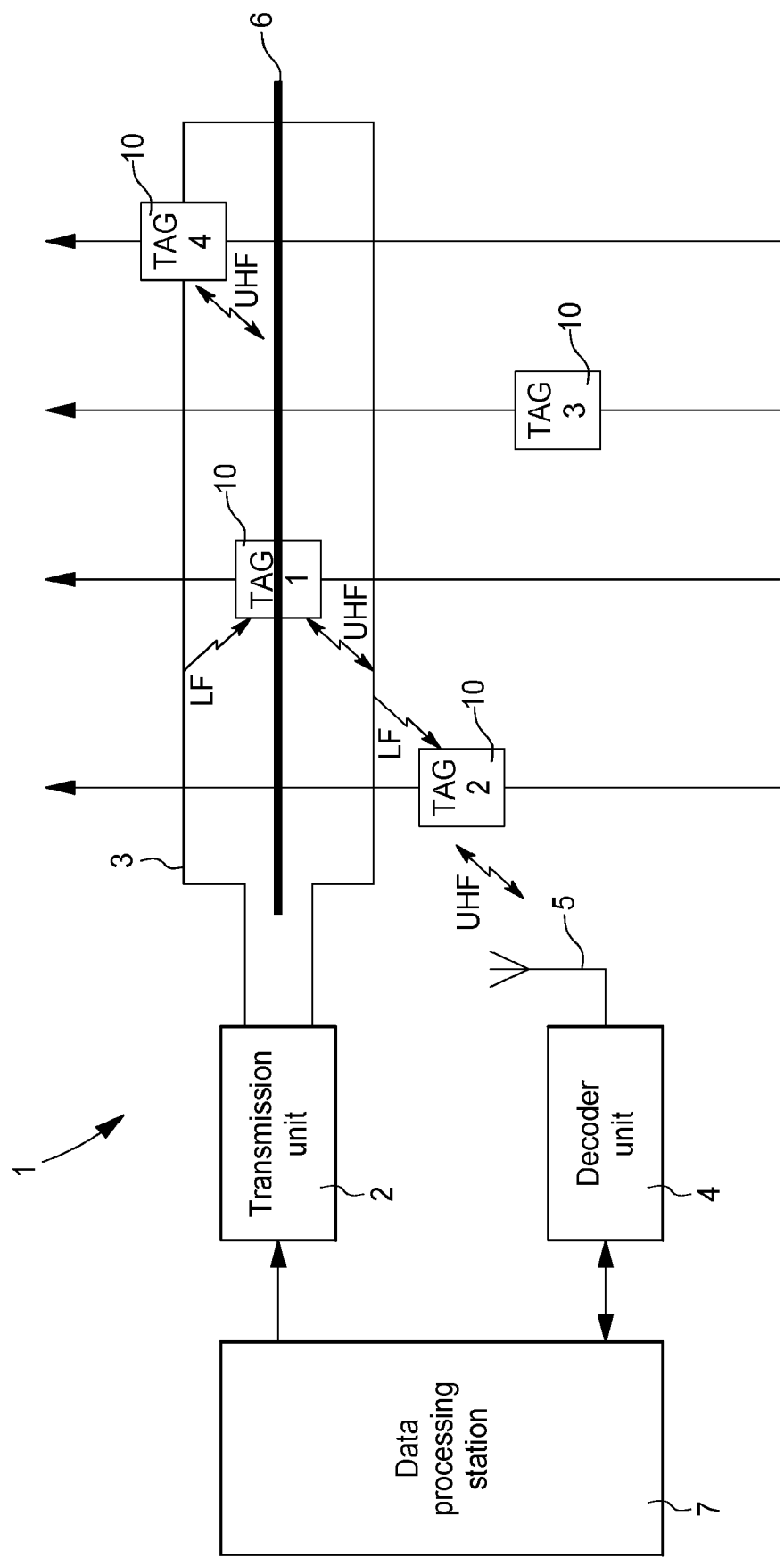
FIG. 1 is a schematic view of an automated measuring system, which includes several transponder modules for implementing the method for measurement of at least one crossing time on a line of passage in a sports competition time according to the invention.

FIG. 1 is a schematic view of an automated measuring system 1, which may be used in any type of sports competition mainly for determining a race time or a passing order of a moving object. This measuring system 1 may, for example, be used for an athletics competition, a cycling race, a horserace, a car race or another sports competition. The moving object may be a competitor, a horse, a cycle, a vehicle.

Measuring system 1 preferably includes at least one transmission unit 2 for generating a low frequency signal LF, which is an electromagnetic field signal transmitted via a transmission antenna 3 disposed on the ground or on the side of or above the line. The system also includes one or more transponder modules 10, defined as TAG1, TAG2, TAG3, TAG4 each able to be disposed on a moving object, such as a competitor or a racehorse or a cycle or a car. Each transponder module 10 is personalised to the object on which it is placed. Finally, the system includes a receiver unit or decoder unit 4 for receiving via a receiver antenna 5 UHF high frequency signals transmitted by the activated transponder modules to determine a crossing time on a line of passage 6. Transmission unit 2 and decoder unit 4 are connected to and controlled by a data-processing station 7.

Figure 3:
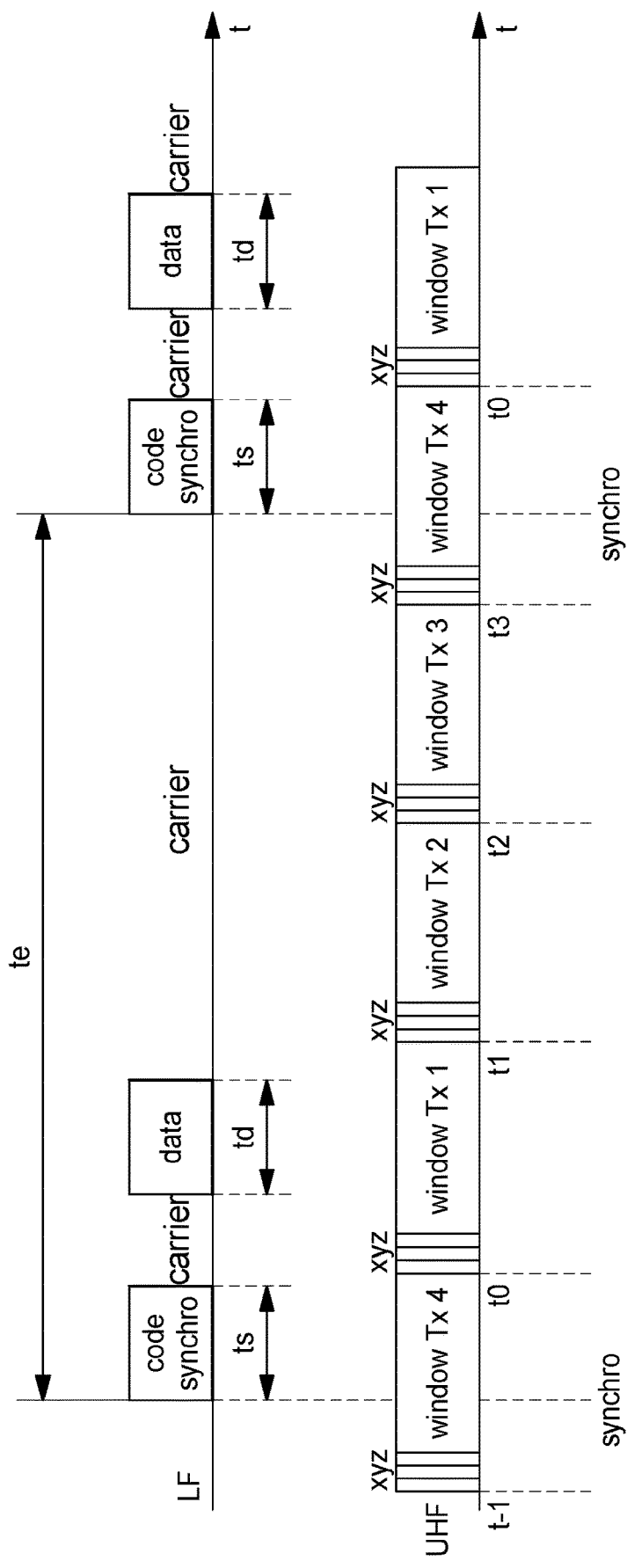
FIG. 3 shows a graph of the low frequency electromagnetic field signals and transmission and the transmission or reception signals of the high frequency transponder unit of the crossing time measurement system according to the invention.

As specified in more detail below with reference to FIG. 3, each transponder module 10 approaching the line of passage can be woken up and synchronised by the modulated electromagnetic field signal. To do this, in each repetition period te, antenna 3 transmits an electromagnetic field signal modulated with at least one synchronisation and activation command for the moving transponder module. For this first modulation of the electromagnetic field signal at the start of each repetition period te, an antenna identification code can also be modulated to define the antenna from which the electromagnetic field signal is transmitted for the transponder module that detects it. After the transmission of the activation and synchronisation commands, and subsequently the transmission of data, the generated electromagnetic field signal LF no longer varies in frequency and amplitude in order to allow each activated transponder module to measure the electromagnetic field intensity.

The personalised transponder module 10 is preferably an active transponder module, i.e. provided with a battery for the electrical powering of its constituent components. However, to reduce electric power consumption, it is generally in rest mode. In the embodiment shown in FIG. 1, each transponder module 10 can mainly be activated when it receives the activation and synchronization command in the modulated low frequency signal LF transmitted via transmission antenna 3 of transmission unit 2 of measuring system 1. The low frequency electromagnetic field signal LF transmitted by said transmission unit 2 may be, for example, at a carrier frequency of around 125 kHz. This transmission unit may be controlled in a conventional manner by the data processing station 7 of measuring system 1. It can transmit the low frequency signal LF preferably with OOK modulation periods of activation and synchronisation commands via transmission antenna 3 throughout the entire competition.

Transmission antenna 3 may be disposed in or on the ground on the race track or course, or above or on the side. It may preferably be centred on a line of passage 6, which may be an intermediate line of passage or a finish line as shown in FIG. 1. It may extend over the entire width of the race track or course. The width of transmission antenna 3 may be between 10 cm and 2 m, the normal width being around 60 cm.

In the case of a side antenna disposed on line of passage 6, this side antenna may have dimensions of 1 m×1 m or less, such as 60 cm×60 cm, or other dimensions depending on the sports competition. This antenna can detect the passing of competitors over a maximum race track or course width of 10 m. The antenna is thus positioned vertically on the side of the race course or track and can measure the passing of competitors between 0 m and 10 m.

It is to be noted that several transmission antennas may also be placed at different locations on the race course or track and each connected to its own electromagnetic field signal generation unit. This makes it possible to determine intermediate times and finish times for the race for each moving object carrying a personalized transponder module.

Generally, each transponder module 10 can be activated by the activation and synchronization command modulation in the low frequency signal transmitted via the transmission antenna at a close distance of 2 to 4 m from the line of passage. The nearer transponder module 10 comes to line of passage 6, such as the finish line, the greater the increase in the level of low frequency signal LF without modulation and at a stable frequency, captured by the transponder module.

The level of low frequency signal LF captured by the transponder module varies as a function of position and distance relative to the centre of the antenna. A signal analysis algorithm makes it possible to determine the position of the transponder module relative to line of passage 6, which may be the finish line or a line on the race track or course. Different measurements of the intensity of the electromagnetic field captured by the transponder module are transmitted in at least one measurement signal directly after each measurement or in measurement packets preferably before the line of passage or finish line is crossed. In these conditions, decoder unit 4 in conjunction with data processing station 7 can determine the crossing time of the moving transponder module by predicting the actual time before said line 6 is crossed. This prediction is necessary to prevent the race time chronometer going backwards during the display of the actual time of each competitor.

As shown in FIG. 1, the first transponder module TAG1 is located on line of passage 6, which may be the finish line. It is activated and synchronized by the modulated low frequency signal LF from transmission antenna 3. The second transponder module TAG2 is located close to transmission antenna 3. It can also be activated and synchronized by the modulated low frequency signal LF from transmission antenna 3, even if the level of said captured low frequency signal LF is at a low level. The third transponder module TAG3 is far from transmission antenna 3. Thus, the third transponder module is not able to be activated and synchronized by low frequency signal LF from transmission antenna 3 and remains in rest mode. The fourth transponder module TAG4 is shown having crossed the finish line and in this case, it is able to receive a command from decoder unit 4 to deactivate it and set it in rest mode.

If each transponder module 10 is not activated and synchronized by low frequency signal LF from transmission antenna 3, it remains in rest mode. However, if the transponder module is activated and synchronised, it can measure several electromagnetic field intensity levels and transmits the intensity levels to a decoder unit 4 before crossing line of passage 6. The passing or finish time of the moving object in decoder unit 4 is obtained by calculating, for example, the maximum field value captured by the transponder module and reconstructed in decoder unit 4 or in data processing station 7.

The measurement or information signal is transmitted by transponder module 10 and captured by receiver antenna 5 of decoder unit 4 of measuring system 1. This UHF information signal may be at a frequency of between 300 MHz and 3000 MHz, or at other frequencies outside this frequency band. The transmission of the UHF signal from the transponder module to the decoder unit may occur on a carrier frequency, selected from among N carrier frequencies, where N is an integer number greater than 1. 8 carrier frequencies may be provided and selected as a variant of a frequency hopping. The data sent by the transponder module is thus divided into packets. The first packet of one or more measurements or of one or more groups of measurements of the electromagnetic field intensity, is sent for example on frequency $f_n$, whereas the next packet is transmitted on another frequency $f_m$ of the 8 frequencies to be selected.

The information transmitted by the transponder module can be accurate, since each transponder module is synchronised by the modulated electromagnetic field signal to perform the various intensity measurements at regular time intervals. Further, with frequency hopping transmission, it is possible to increase the number of transponder modules able to be simultaneously detected by the decoder unit, and to prevent the risk of collision between the UHF communications. Each transponder module follows the same hopping sequence, but the starting frequency is assigned in a pseudo-random manner. For example, over 20 transponder modules, or even 50 transponder modules can be counted, depending on the configuration, as they cross a line of passage. In the case of the communication of several groups of intensity measurements from each transponder module, it is even possible to detect, for example, close to 24 transponder modules crossing said line of passage.

Decoder unit 4 is connected to the data processing unit 7 of measuring system 1. This processing station 7 may be used for processing data from decoder unit 4 and displaying the various times of the competitors, horses or vehicles with their ranking. Decoder unit 4 may also be used for programming each transponder module 10 by transmission of a high frequency signal with digital or GFSK modulation of data or commands. FIG. 1 does not show a possible second antenna for performing transmission to the transponder module. The signal transmitted by decoder unit 4 may also be used to personalise said module, for example, to the respective runner. Further, the UHF signal transmitted by decoder unit 4 can also deactivate each transponder module once the line of passage has been crossed by said moving object with the transponder module.

It is also to be noted that after the activated transponder module has crossed the line of passage, the UHF signal transmitted by the decoder unit to the transponder module may include information relating to the competitor, particularly his ranking, time, or even disqualification. Decoder unit 4 can also send a message in the UHF signal to the transponder module to determine the battery level or state of operation of the transponder module. Once the UHF information signal is received by the decoder unit, the transponder module may communicate this information to the person wearing said module via at least one LED source, a display screen, an acoustic alarm or a vibrator. In this case, it may be applied to a track cycle race, in which the last competitor of each lap can receive information about a disqualification. This information can be indicated by means of a red LED light source on the handlebars of his bicycle.

Figure 2:
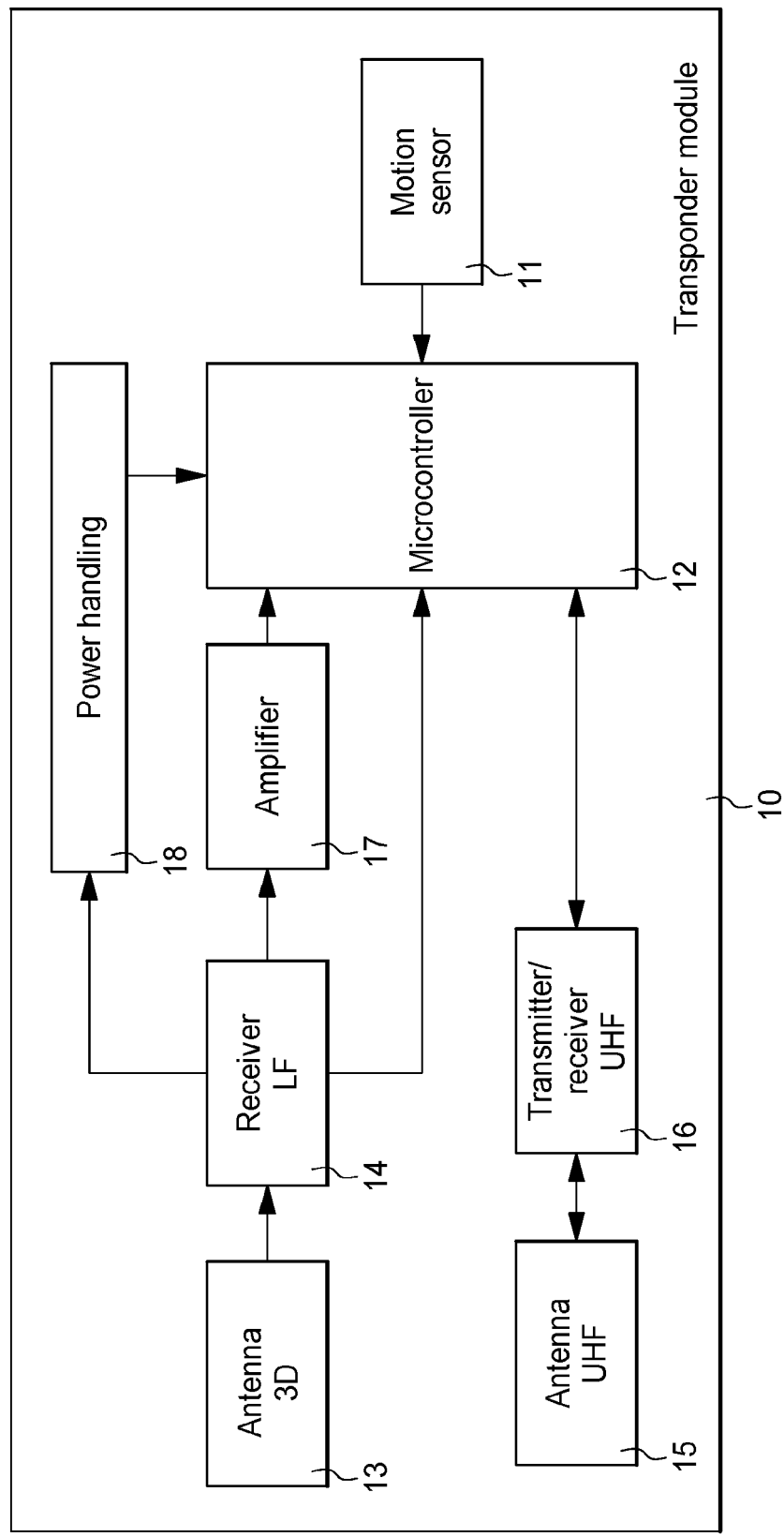
FIG. 2 shows an embodiment of a transponder module for implementing the method for measurement of at least one crossing time on a line of passage according to the invention.

One embodiment of transponder module 10, which can be used for any type of sports competition, is shown in FIG. 2. Transponder module 10 may include a low frequency signal receiver 14 for receiving low-frequency signals, such as electromagnetic field signals via an antenna 13, which may be a single axis or two-axis or preferably triaxial antenna. The transponder module may be of the active type with a battery for the electrical powering of the electronic components of the transponder module. To reduce the electric power consumption of the transponder module, a power handling unit 18 may be provided. The battery may form part of this handling unit or be connected thereto. The power handling unit can manage the electric power supply to the electronic components of the module. Normally, power handling unit 18 can operate the electric power supply on reception by the transponder module of an activation and synchronization command of a low frequency signal.

The transponder module also includes a high-frequency transmitter or a transceiver 16 for transmission of UHF signals via an antenna 15 or set of antennas with electromagnetic coupling of one or more information signals. These information signals are at a carrier frequency of between 300 MHz and 3000 MHz, or at other frequencies outside this frequency band. The information signal or signals are transmitted on the command of a microcontroller 12 to a decoder unit 4 of a measuring system 1 of FIG. 1. Preferably, the transponder module may also include a time base in association with the microcontroller 12, which may be synchronised by the modulated and captured electromagnetic field signal LF.

The transponder module may also include a motion sensor 11, such as an accelerometer to facilitate and improve determination of a race time. This motion sensor 11 is connected to microcontroller 12. In the case of a sports competition, such as a track cycling race, the line of passage may include a strip of a certain thickness. The motion sensor of the transponder module disposed on the bicycle frame can detect a sharp variation in motion following the impact of the bicycle wheel on said passage strip. Thus, it can provide information in a UHF signal transmitted by transponder module 10 in combination with each intensity measurement or with one or more groups of intensity measurements of the captured electromagnetic field to decoder unit 4.

The low frequency signal receiver 14 of transponder module 10 is connected to microcontroller 12 and to power handling unit 18. The receiver output is also connected to an amplifier 17, which delivers an amplified reception signal to microcontroller 12 for measuring the field level detected by the transponder module. This also increases the measurement dynamics. Thus, it is possible to capture tiny low frequency signals or very strong low frequency signals.

Once activated, transponder module 10 can measure, via triaxial antenna 13, one or more successive groups of intensity measurements of the captured electromagnetic field without modulation. One group of intensity measurements includes three electromagnetic field measurements on the X, Y, Z axes captured by the triaxial antenna at a given time. Each group of electromagnetic field intensity measurements defines a data packet of or data point relating to each determined measurement time. These measurements on the three measurement axes are generally defined by a received signal strength indication circuit. Each group of intensity measurements obtained can be stored in the transponder module and/or directly transmitted in a UHF information signal to the decoder unit. Preferably, two, three, four or more groups of intensity measurements are obtained at regular time intervals, which are stored and/or transmitted together in a data packet by the UHF information signal to decoder unit 4.

With the various groups of intensity measurements obtained prior to the crossing of the line of passage and received, decoder unit 4 in association with the data processing station is able to reconstruct the electromagnetic field and thus accurately determine the passing or finish time of the moving object. In general, the closer the transponder comes to the centre of the transmitter antenna, the stronger will be the field captured without modulation. The race time is accurately determined, given the good synchronisation between the data processing station and each activated transponder module.

It is also to be noted that in order to determine the crossing time, the decoder unit can capture several successive data packets transmitted by each activated transponder module and each obtained in every modulation repetition period of electromagnetic field signal LF. It is therefore possible to transmit successively each packet of three or four groups of intensity measurements between each transmission of an activation and synchronisation code or command from the modulated electromagnetic field signal transmission unit.

To understand the operation of the system for measurement of at least one crossing time of a moving object provided with a personalised transponder module over a line of passage, the crossing time measuring method is described with reference to FIG. 3. As can be noted in FIG. 3, the transmission unit of the measurement station generates an electromagnetic field signal LF at a carrier frequency of around 125 kHz. This electromagnetic field signal is modulated, for example OOK modulated, to transmit an activation and synchronisation command of duration ts, at the start of each period te. The initial modulation of electromagnetic field signal LF, which may also include the transmission antenna identification code in addition to the activation code or command and the synchronisation code or command, is performed in a short period ts relative to the repetition period te of said electromagnetic field signal modulation.

After this electromagnetic field signal modulation, there is a period in which the electromagnetic field signal is generated by the transmission unit without modulation at a constant frequency and amplitude. It is in this first period without modulation, that each transponder module, once activated and synchronised, can perform a first electromagnetic field intensity measurement at time t0. Preferably at this time t0, three simultaneous electromagnetic field intensity measurements are performed by the triaxial antenna of the transponder module, to define a first group of intensity measurements on the three X, Y, Z axes. This first group of intensity measurements can be transmitted directly in a first embodiment to the decoder unit in a time window Tx 1 or be stored in the transponder module.

During this first transmission time window Tx 1 of the transponder module, there may be a second modulation of data in electromagnetic field signal LF of duration td. For this second modulation, there may be information to tell the transponder module the frequency on which the UHF communication from the decoder unit to the transponder unit will occur after the crossing of the line of passage, for example. Other data may also be transmitted during this second modulation of data in the electromagnetic field signal.

After the duration td of transmission of the second modulation of the electromagnetic field signal, there is a period with no modulation until the end of the repetition period te of modulations in electromagnetic field signal LF. During this period without modulation, the transponder module can perform several other electromagnetic field intensity measurements, which may be successively and directly transmitted to the decoder unit or be stored and transmitted in the form of a data packet. Thus a data packet can be transmitted in each modulation repetition period of the electromagnetic field signal.

The electromagnetic field intensity measurements are performed at regular time intervals after synchronisation of the transponder module. A first intensity measurement or a first group of intensity measurements in the case of a measurement on the three axes of the triaxial antenna of the transponder module, are performed at the first time t0, which is a reference time in each modulation repetition period te of electromagnetic field LF. Subsequently, a second intensity measurement or a second group of intensity measurements are performed at second time t1. A third intensity measurement or a third group of intensity measurements may also be performed at third time t2. Finally, a fourth intensity measurement or a fourth group of intensity measurements may also be performed at fourth time t3.

The time gap between each determined measurement time t0, t1, t2 and t3 is identical or regular and synchronised on reception of the actuation and synchronisation command in the modulated electromagnetic field signal LF. Each intensity measurement or group of intensity measurements can be directly transmitted in a respective transmission time window Tx 1, Tx 2, Tx 3, Tx 4 from the transponder module to the decoder unit. Each transmission window follows a measurement or group of measurements. Preferably, the transponder module transmits in the modulated UHF signal a data packet, comprising several successive intensity measurements or several groups of successive intensity measurements. The decoder unit in association with the processing station is able to know at which moment the different measurements or groups of measurements of each received data packet were performed, given that synchronisation of each transponder module is controlled from the transmission unit on the command of the processing station of the measurement system.

Several data packets can be transmitted prior to each moving transponder module crossing the line and in each modulation repetition period in electromagnetic field signal LF. Once the line of passage, for example the finish line, has been crossed, the decoder unit can transmit a stop command via a modulated UHF signal to the transponder module. The stop command is preferably received in the first transmission window of the transponder module after the decoder unit, in association with the processing station, has been able to predict said line crossing time. This stop command is received by the transponder module after the sending of any intensity measurement or any group of intensity measurements in the first window. The transponder module is thus placed in rest mode after reception of this stop command to avoid disrupting the communication of the other transponder modules which have not yet crossed the line of passage. Other information may also be transmitted by the decoder unit to the transponder module as mentioned above.

It is also to be noted that with the same electromagnetic field signal transmission unit, several transponder modules can be activated and synchronised, and consequently also synchronised with each other. Transmissions of information between the activated transponder modules may also be provided. It is also possible to combine a communication protocol of the time division multiple access type with frequency hopping. As previously indicated, this makes it possible to increase the number of detections of moving transponder modules in the measurement system by means of the decoder unit.

By way of non-limiting example, it is possible to have repetition periods te of the modulation of the synchronisation command of electromagnetic field signal LF between 10 and 20 ms, preferably on the order of 14 ms. The duration is of the first synchronisation modulation may be between 5 and 10 times lower than repetition period t2, for example on the order of 2 ms. The same is true for the duration td of the second modulation. This second modulation may occur after a time of less than 4 to 6 times repetition period te, preferably after around 3 ms from the start of repetition period te. Preferably, this second modulation occurs after a duration corresponding to half the duration of each modulation after the end of the first modulation. The first intensity measurement or the first group of intensity measurements may start just after the 2 ms of the first modulation of the electromagnetic field signal. The time gap t1-t0, t2-t1, t3-t2 between each measurement time is identical or regular and be of a duration between 3 and 6 times lower than the repetition period, preferably corresponding to a quarter of repetition period te and having a value of 3.5 ms. Thus, there may be four intensity measurements or four groups of intensity measurements per modulation repetition period of the electromagnetic field signal. However, naturally other values may be provided without limiting the scope of the invention.

For the transmission of each data packet from each activated transponder module, each packet may include in the message a UHF preamble, a synchronisation word, identification information for the transponder and for the transmitter antenna, and the state of the battery or the time gap between each measurement. Subsequently there is indicated in the transmitted message the first group of intensity measurements at the first reference time value t0. There may be transmitted in the same message after the first group of measurements, the various measurements or groups of measurements at the different measurement times t1, t2, t3. However, it may be preferred instead to transmit the difference in intensity relative to the preceding intensity measurement or to the preceding group of intensity measurements. The message may also include redundant values for measurements or groups of measurements performed before the first time t0, for example at time t−2 and/or t−1. The message transmitted with the data packets may be of a duration close to 2 ms.

It is to be noted that in the case of direct transmission of each measurement or group of measurements of electromagnetic field intensity, the transmitted message may include the UHF preamble, a synchronisation word, identification information for the transponder and the transmitter antenna, and the state of the battery or the time gap between each measurement. The message then includes the intensity measurement or group of intensity measurements on the corresponding X, Y, Z axes. Each message with a single measurement or a single group of measurements may have a duration on the order of 1 ms.

From the description that has just been given, several variants of the method for measurement of at least one crossing time on a line of passage in a sports competition can be devised by those skilled in the art without departing from the scope of the invention defined by the claims. The transponder module may further comprise a magnetic sensor for determining the direction of crossing of each line of passage by measuring the earth's magnetic field. The number of transmission windows from the transponder module per modulation repetition period of the electromagnetic field signal may be greater than 4.

What is claimed is:

1. A method for measurement of at least one crossing time at a line of passage of at least one moving object by a personalized transponder placed on the moving object, during a sports competition in a measuring system, which includes at least one transmitter of an electromagnetic field signal via an antenna disposed on the line of passage and circuitry configured to receive at least one measurement signal from each transponder in proximity to the line of passage, the method comprising:
    generating the electromagnetic field signal by the transmitter, the electromagnetic field signal comprising a modulation of a synchronization command at the start of each modulation repetition period;
    activating the personalized transponder on the first reception of the modulated synchronization command in the electromagnetic field signal;
    measuring the intensity of the electromagnetic field signal without modulation captured by the transponder once activated and synchronized, at regular time intervals; and
    transmitting directly via the transponder each intensity measurement or a packet of intensity measurements to the circuitry that determines a crossing time of the line of passage on the basis of variation in the electromagnetic field intensity of the measurements received from the transponder.

2. The method of measurement according to claim 1, wherein the electromagnetic field intensity measurements or the packet of intensity measurements are transmitted by the transponder before the crossing of the line to allow the circuitry to determine the crossing time before the crossing of the line of passage by the transponder and thus to predict an actual crossing time on the line of passage.

3. The method according to claim 1, wherein each transponder of the measuring system includes a triaxial antenna for measuring the intensity of the electromagnetic field signal on three axes and providing a group of intensity measurements at each defined measurement time,
    wherein the transponder directly transmits, in a measurement signal, each group of intensity measurements performed or a packet of different groups of intensity measurements performed successively at regular time intervals to the circuitry that determines a crossing time on the line of passage on the basis of the variation in the electromagnetic field intensity of the group or groups of intensity measurements received from the transponder.

4. The method according to claim 3, wherein a first intensity measurement or a first group of intensity measurements in each modulation repetition period of the electromagnetic field signal starts after an end of a duration of a first modulation, when the electromagnetic field signal is without modulation and generated at a constant frequency and amplitude by the transmitter.

5. The method according to claim 4, wherein a first window for transmission or reception of information signals from the transponder is defined after the first intensity measurement or the first group of intensity measurements.

6. The method according to claim 4, wherein a second modulation of data occurs per modulation repetition period in the electromagnetic field signal generated by the transmitter after the first intensity measurement or the first group of intensity measurements.

7. The method according to claim 6, wherein data in the second modulation of the electromagnetic field signal concerns information about a UHF communication frequency between the circuitry and the transponder after the crossing of the line of passage.

8. The method according to claim 6, wherein the duration of the first modulation is equal to a duration of the second modulation of the electromagnetic field signal.

9. The method according to claim 1, wherein each modulation of the electromagnetic field signal is an OOK modulation.

10. The method according to claim 4, wherein a second intensity measurement or a second group of intensity measurements occurs after a regular time interval in each modulation repetition period of the electromagnetic field signal and when the electromagnetic field signal is without modulation.

11. The method according to claim 10, wherein third and fourth intensity measurements or third and fourth groups of intensity measurements occur successively at regular time intervals in each modulation repetition period of the electromagnetic field signal and when the electromagnetic field signal is without modulation, and
wherein second, third and fourth windows for transmission or reception of information signals from the transponder are defined respectively after the second, third and fourth intensity measurements or the second, third and fourth groups of intensity measurements.

12. The method according to claim 11, wherein a transmission of a packet of intensity measurements or of groups of intensity measurements is performed from the transponder in a fourth window for transmission or reception of information signals in each modulation repetition period of the electromagnetic field signal.

13. The method according to claim 11, wherein a time gap between each intensity measurement or each group of intensity measurements is equal to a quarter of each modulation repetition period of the electromagnetic field signal.

14. The method according to claim 13, wherein each modulation repetition period is defined between 10 ms and 20 ms at a frequency of the electromagnetic field signal of between 100 kHz and 150 kHz.

15. The method according to claim 1, wherein once the transponder has crossed the line of passage, the circuitry transmits a high frequency control signal to the transponder in order to deactivate the module.

16. The method according to claim 15, wherein the circuitry transmits other information in the high frequency signal to the transponder, said other information concerning information relating to a competitor, including ranking, race time, or disqualification.

17. The method according to claim 15, wherein the circuitry transmits the high frequency control signal to the transponder in a first transmission window after a first intensity measurement or a first group of intensity measurements of the electromagnetic field signal from the transponder in each modulation repetition period.

18. The method according to claim 1, wherein the electromagnetic field signal generated by the transmitter is at a low frequency, and
wherein a measurement signal transmitted by the transponder is at a high frequency.

19. The method according to claim 18, wherein the transponder transmits a data signal at a carrier frequency of between 300 MHz and 000 MHz to the circuitry of the measuring system.

20. The method according to claim 18, wherein a carrier frequency of the measurement signal from the transponder is selected from N carrier frequencies, where N is an integer number greater than 1.

21. A measuring system, comprising:
a set of transponders each carried by a moving object and each personalized to a moving object;
at least one transmitter of an electromagnetic field signal via an antenna disposed on the line of passage; and
circuitry configured to receive at least one measurement signal from each activated transponder in proximity to the line of passage,
wherein each transponder in proximity to the line of passage is activated by reception of a synchronisation and activation command in the electromagnetic field signal in order to perform intensity measurements of the electromagnetic field signal without modulation and to transmit these measurements to the circuitry.

22. The measuring system according to claim 21, wherein the antenna of the electromagnetic field signal is a side antenna disposed on the line of passage, and positioned vertically on the side of a race course or track.

23. The measuring system according to claim 22, wherein the dimension of the side antenna may be 1 m×1 m or less to detect the passing of competitors on a maximum race course or track width of 10 m.

24. A transponder, comprising:
a low frequency signal receiver receiving an electromagnetic field signal, via a low frequency antenna;
a microcontroller, receiving a reception signal from the receiver, measuring an intensity of the captured electromagnetic field signal without modulation, once activated by reception of a modulated synchronisation command in the electromagnetic field signal; and
at least one transmitter, connected with the microcontroller, configured to transmit, via a high frequency antenna, at least one high-frequency measurement signal.

25. The transponder according to claim 24, wherein the transponder is of an active type and includes power handling circuitry for activation of the transponder on reception of the modulated synchronisation command in the electromagnetic field signal.

26. The transponder according to claim 24, further comprising: a transmitter/receiver in association with the microcontroller for transmitting, through the high-frequency antenna, a measurement signal or receiving a high frequency control signal from circuitry of a measuring system.

27. The transponder according to claim 24, wherein the low frequency antenna is a triaxial antenna for measurement on three axes, wherein the high frequency antenna is a loop antenna.

28. The method according to claim 1, wherein after the transmission of the synchronisation command, the electromagnetic field signal no longer varies in frequency and amplitude in order to allow the personalized transponder to measure the electromagnetic field intensity without modulation.

* * * * *